US010171938B2

(12) United States Patent
Partheesh et al.

(10) Patent No.: US 10,171,938 B2
(45) Date of Patent: *Jan. 1, 2019

(54) USE OF GEOFENCES FOR LOCATION-BASED ACTIVATION AND CONTROL OF SERVICES

(71) Applicants: Mani Partheesh, Santa Clara, CA (US);
Kirupa Pushparaj, Santa Clara, CA (US)

(72) Inventors: Mani Partheesh, Santa Clara, CA (US);
Kirupa Pushparaj, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/586,521

(22) Filed: May 4, 2017

(65) Prior Publication Data

US 2017/0238133 A1    Aug. 17, 2017

Related U.S. Application Data

(63) Continuation of application No. 14/337,065, filed on Jul. 21, 2014, now Pat. No. 9,674,658, which is a
(Continued)

(51) Int. Cl.
*H04M 3/00* (2006.01)
*G05D 23/00* (2006.01)
(Continued)

(52) U.S. Cl.
CPC ......... *H04W 4/021* (2013.01); *H04L 12/2816* (2013.01); *H04M 1/72533* (2013.01);
(Continued)

(58) Field of Classification Search
CPC ....... F24F 2011/0068; F24F 2011/0063; F24F 2011/0035; F25B 2600/07; G05B 13/02; G05B 2219/264
(Continued)

(56) References Cited

U.S. PATENT DOCUMENTS 6,792,319 B1* 9/2004 Bilger .................. G05B 15/02
                                                        700/12
7,519,463 B2    4/2009 Bradley et al.
(Continued)

OTHER PUBLICATIONS

Non-Final Office Action dated May 18, 2012 for U.S. Appl. No. 13/342,825 by Partheesh, M., et al., filed Jan. 3, 2012.
(Continued)

*Primary Examiner* — Joshua Schwartz
(74) *Attorney, Agent, or Firm* — Perkins Coie LLP

(57) ABSTRACT

Disclosed herein is a geofence service that enables various remote control and automatic operations based a user's current geographic position as determined by the user's mobile device's current geographic location. The geofence service enables the user to define one or more geofences based on specific geographic locations. Such geofences may be applied against several geofence applications for remote and automatic control of devices. In one embodiment, the mobile device's volume or power control settings are adjusted based on the user's location inside or outside a geofence. In one embodiment, temperature setting of a building or house is controlled based on user's proximity to a geofence. In one embodiment, electrical appliances within a home are activated and controlled automatically based on user's current geographic location.

6 Claims, 7 Drawing Sheets

Related U.S. Application Data continuation of application No. 13/342,825, filed on Jan. 3, 2012, now abandoned.

(60) Provisional application No. 61/397,727, filed on Jan. 3, 2011.

(51) Int. Cl.
  *H04W 4/021* (2018.01)
  *H04L 12/28* (2006.01)
  *H04M 1/725* (2006.01)

(52) U.S. Cl.
  CPC ... *H04M 1/72572* (2013.01); *H04L 2012/285* (2013.01); *H04L 2012/2841* (2013.01)

(58) Field of Classification Search
  USPC ...... 455/420, 456.1, 456.3; 700/726; 236/51
  See application file for complete search history.

(56) References Cited

U.S. PATENT DOCUMENTS

| | | | | |
|---|---|---|---|---|
| 7,567,844 | B2* | 7/2009 | Thomas | G05B 15/02 348/143 |
| 2006/0186214 | A1* | 8/2006 | Simon | F24F 11/0012 236/1 C |
| 2008/0184751 | A1 | 8/2008 | Olsen et al. | |
| 2010/0245536 | A1 | 9/2010 | Huitema et al. | |
| 2011/0153525 | A1* | 6/2011 | Benco | G01S 5/0027 705/412 |
| 2011/0290893 | A1* | 12/2011 | Steinberg | F24F 11/0034 236/49.3 |
| 2012/0172027 | A1 | 7/2012 | Partheesh et al. | |
| 2015/0140994 | A1 | 5/2015 | Partheesh et al. | |
| 2015/0309483 | A1* | 10/2015 | Lyman | G05B 15/02 700/275 |
| 2016/0069582 | A1* | 3/2016 | Buduri | F24F 11/0034 165/237 |

OTHER PUBLICATIONS

Non-Final Office Acton dated May 9, 2016 for U.S. Appl. No. 14/337,065 of Partheesh, M. et al., filed Jul. 21, 2014.

Notice of Allowance dated Mar. 1, 2017 for U.S. Appl. No. 14/337,065 of Partheesh, M. et al. filed Jul. 21, 2014.

U.S. Appl. No. 13/342,825 by Partheesh, M., et al., filed Jan. 3, 2012.

U.S. Appl. No. 14/337,065 by Partheesh, M., et al., filed Jul. 21, 2014.

* cited by examiner

GeoFence Parameters.

- Custom Geo Profile
- Zip
- Area Code
- IP Address of Wireless Profile
- Any WiFi Connection
- Vicinity of an Address
- An Address
- Auto Geo Profile

Fig. 2

User Interface

GeoFence Applications Control Panel

| | Yes | No | Choose GeoFence CP |
|---|---|---|---|
| Auto Geo Profile | ☑ | ☐ | None |
| Vibrate Setting | ☑ | ☐ | GF1.PRF |
| 3G On/Off | ☐ | ☑ | None |
| Temperature Control | ☐ | ☑ | None |

Fig. 3B

Garage Opener Settings

Create Profile

→ Choose Garage Opener 10 [ ▽ ]

→ GeoFence to Apply [ Pick One ▽ ]

→ Control Timing:
Apply Profile [   ] Minutes After Entering GeoFence

Fig. 5A

Temperature Settings

Choose Room: [                    ]

[ Temperature Stagger Settings ]

Choose Temp At GeoFence Exit [ 92 F ]
Choose Temp At GeoFence Entrance [ 78 F ]
Geo Fence: [              ]

Fig. 5B

Appliance Power Settings

Choose Appliances To Start [              ]
Choose Appliances To Stop [              ]
Geo Fence [              ]

Fig. 5C

USE OF GEOFENCES FOR LOCATION-BASED ACTIVATION AND CONTROL OF SERVICES

CLAIM OF PRIORITY

This application is a continuation application of U.S. patent application Ser. No. 14/337,065, filed Jul. 21, 2014, titled Ser. No. 13/342,825, filed Jan. 3, 2012, titled "USE OF GEOFENCES FOR LOCATION-BASED ACTIVATION AND CONTROL OF SERVICES," which is a continuation application of U.S. patent application Ser. No. 13/342,825, filed Jan. 3, 2012, titled "USE OF GEOFENCES FOR LOCATION-BASED ACTIVATION AND CONTROL OF SERVICES," which claims the benefit of U.S. Provisional Patent Application No. 61/397,727, filed Jan. 3, 2011, titled "REMOTE APPLIANCE CONTROL UTILIZING GEOFENCING TECHNIQUES," all of which are expressly incorporated by reference herein.

FIELD

This application generally relates to the field of controlling electrical and electronic appliances and services offered by such appliances utilizing geofencing capabilities offered through the user's mobile device.

BACKGROUND

With the ever increasing availability of smart phones, more and more users are able to use their mobile devices not just for telephone conversations, but for advanced services (e.g., Internet browsing, digital video playback, etc.) that would normally require a personal computer. Such smart phones typically include geo-positioning capabilities (e.g., GPS locators, etc.), allowing the mobile device to be cognizant of its present geographic location.

These advanced services come at the cost of increased power consumption, requiring a user to frequently charge the phone for reliable and continuous usability. In most smart phones, a user may be able to manipulate certain settings (e.g., WiFi connection on/off, Bluetooth connection on/off, etc.) to efficiently manage battery life. Typically, a user would have to manually control such settings based on the user's location. For example, when the user is home (with ready access to a power outlet to charge his phone), the user may have his WiFi and Bluetooth radios turned on. However, when the user is on the road, the user would have to remember to turn off the radios to be able to conserve power. The user would have to manually make desired changes based on changing geographic situations.

In another similar example, a user may wish to manually change ring-option settings based on the user's present location. For example, the user may desire full volume ring setting at home but may wish the phone on vibrate when he is outside of his house. The user may forget to change these settings every time he leaves or enters his house, leading to either missed calls at home or unintended interruption at public places.

In some examples, users may utilize the mobile phone to remotely control equipment (e.g., dish washer, HVAC control, etc.). For example, a user may connect to an automated system to remotely monitor and change temperature settings of his house. In present remote control systems, the user would need to manually connect to an online interface (e.g., using Internet browsing capabilities in his mobile phone) to be able to make such changes. There are some examples by which the user can automate such settings—for example, the user may set time-based control by which the temperature at his home shifts to particular values based on the time of the day. However, such automatic settings are unintelligent in that they are consistently applied regardless of whether the user is actually located at his home or not.

SUMMARY OF THE DISCLOSURE

This application discloses a geofence service that enables various remote control and automated operations based a user's current geographic position as determined by the user's mobile device's current geographic location. The geofence service enables the user to define one or more geofences based on particular geographic locations. Such geofences may be used in conjunction with several mobile-based "geofence applications" for remote and automatic control of devices. In one example, the mobile device's volume or power-control settings (e.g., wireless radios, Bluetooth radios) are automatically adjusted based on the user's location inside or outside a geofence. In one example, the temperature setting of a building or house is selectively controlled based on the user's proximity to a geofence defined relative to the building or the house. In one example, electrical appliances within a geofence (e.g., within a house) are automatically activated and controlled based on the user's current geographic location relative to the geofence.

BRIEF DESCRIPTION OF DRAWINGS

In the drawings:

FIG. 2 identifies examples of parameters that a user or the geofence service may utilize to define a geofence;

FIGS. 3A-3B are examples of a user interface that allows the user to define various geofence parameters;

FIGS. 5A-5C describe examples of geofence applications; and

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

Figure 1:
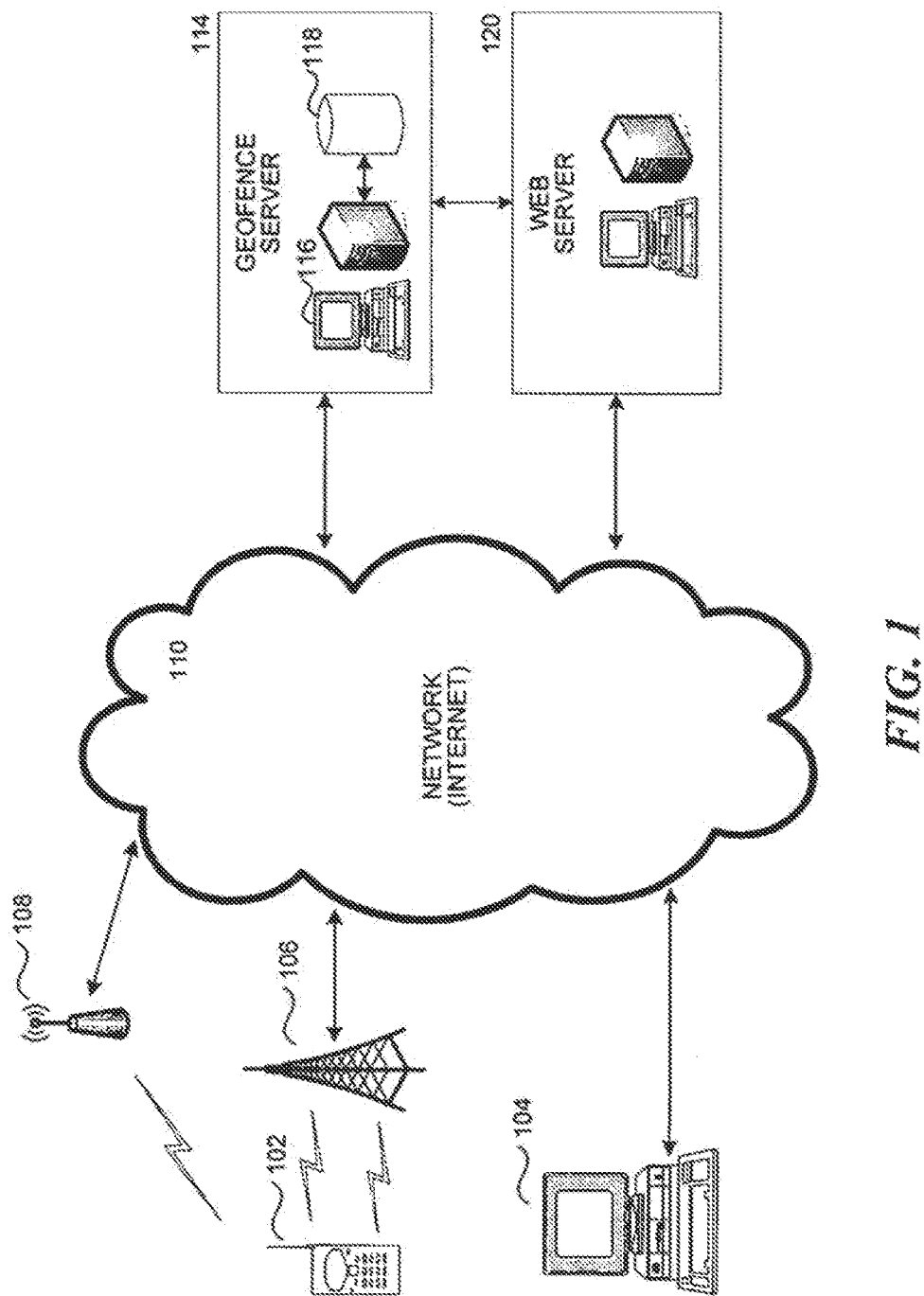
FIG. 1 provides a representative environment in which the invention can be implemented.

FIG. 1 and the following discussion provide a brief, general description of a representative environment in which geofencing applications can be implemented. Although not required, aspects of the invention may be described below in the general context of computer-executable instructions, such as routines executed by a general-purpose data processing device (e.g., a server computer or a personal computer). Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems.

While aspects of the invention, such as certain functions, are described as being performed exclusively on a single device, the invention can also be practiced in distributed environments where functions or modules are shared among disparate processing devices. The disparate processing devices are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data related to the invention may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

As shown in FIG. 1, a user may use a personal computing device (e.g., a phone 102, a personal computer 104, etc.) to communicate with a network. In one example, the phone 102 connects using one or more cellular transceivers or base station antennas 106 (in cellular implementations), access points, terminal adapters, routers or modems 108 (in IP-based telecommunications implementations), or combinations of the foregoing (in converged network embodiments). The network 110 allows the phone 102 (with, for example, WiFi capability) or the personal computer 104 to access web content offered through various web servers. The network 110 may be any type of cellular, IP-based or converged telecommunications network. A user uses one of the personal computing devices (e.g., the phone 102, the personal computer 104, etc.) to connect to a server 114 through the network 110.

The geofence server 114 is a server or other computing system capable of hosting a service that is accessible by other computing systems (e.g., the personal computer 104) through the network 110. As will be explained in more detail below, the geofence server 114 offers a geofence service that enables a variety of capabilities to a mobile user. In one example, the user may selectively define a geographic boundary (i.e., geofence) within which certain functionalities (e.g., mobile device ring options, temperature control settings, etc.) are automatically enabled or disabled based on the mobile device's location inside or outside of the defined geofence.

FIG. 2 illustrates some of the parameters that that may be used to establish a geofence for use in a geofence application. In a first example, a user may define a geofence by means of a zip code. Here, the user may define the geofence to be a geographic boundary defined by a zip code or a particular city (e.g., 95630 or Folsom, Calif.). Here, the geofence application (e.g., an automated phone-ringer controller) would perform different operations based on the mobile device's presence within or outside of the geofence (i.e., within or outside of Folsom, Calif.). In a second example, the geofence may be a geographic boundary custom-defined by a user. For example, a user may pull up a map of a particular area (e.g., a map of Sacramento, Calif.) using services offered by the geofence server 114. Using the map, the user may define a particular geofence location (e.g., by drawing a circle or any other shape over the displayed map to define a geofence boundary). Here, the geofence server 114 would translate the defined map (i.e., the map drawn by the user) and translate it to geographic coordinates for use by the geofence service to determine the presence of the user within a given geofence. In a third example, the user may define a geofence based on a telephone area code (e.g., 916 area code for the Sacramento, Calif. region). Here, the geofence server 114 may determine a mobile user's current area code and perform functions based on whether the user is located within or outside a geographic boundary defined by the area code. In the above examples, the user may simultaneously define two or more locations (e.g., two area codes, two cities, etc.) to be one geofence, such that various operations may automatically be performed based on whether the mobile user is inside or outside any of the geographic locations.

In another example, the user may define a geofence based on the mobile device's connection to a particular WiFi or Wireless LAN device. Here, a user may have configured his mobile device such that the device automatically connects to a particular WiFi or Wireless LAN connection when the device is within range of a hub offering such a connection. For example, when a user enters his home, his mobile device may be configured to automatically connect to a wireless internet offered by the home's wireless adapter. So, the phone would use the wireless internet for data services instead of using a 3G or 4G service offered by the user's mobile service provider. Here, the geofence is defined by whether the mobile device is presently connected or not connected to the wireless network. In some examples, the user may specifically specify the name of the wireless connection profile (e.g., the SSID) or a particular IP address or any other indicator associated with a particular connection profile in order to activate geofence services only when the mobile device is present within such wireless connection profiles. To sum up, in a first example, the geofence services may be activated when the mobile device is present within the purview of (or connected to) any wireless network (as opposed to a cellular data network). In a second example, the geofence services may be activated only when the wireless device is connected to a specific wireless network.

In some examples, the user may specify a particular address and define a geofence in relation to the particular address (or particular geographic point on a map). For example, the user may enter an address and specify that the geofence is a 2 mile radius around that particular address.

In some examples, an "auto geofence profile" may be used to automatically define a geofence based on the user's current geographic location. For example, one of the geofence applications discussed here is a geofence based phone-ringer manager in a mobile device. In one use, a vibrate-only option may be automatically enabled based on the mobile device's current location within a particular geofence. This particular geofence is normally a fence defined by the user using one of the above examples. However, if an "auto geofence profile" is activated, the geofence service would automatically apply it's own predefined geofences. For example, the geofence service may define a geofence surrounding cinemas, where the user's mobile device automatically goes to vibrate when the user enters that location. The geofence service may predefine this based on mapping information offered through other services (e.g., the geofence service may tap into Google Map® resources to identify such information). In another example, the geofence service may automatically turn off the user's 3G and WiFi services and put the user's phone on vibrate when the service determines that the user is located within a proximity of a hospital (as indicated by the user's present geographic location). In some examples, the geofence service may automatically apply the auto profiles as soon as the user enters these "auto geo fences." In some examples, the geofence service may issue an alert to the user allowing the user to confirm the auto-profile services (e.g., the automatic switchover to vibrate setting) before applying such a setting.

Figure 3A:
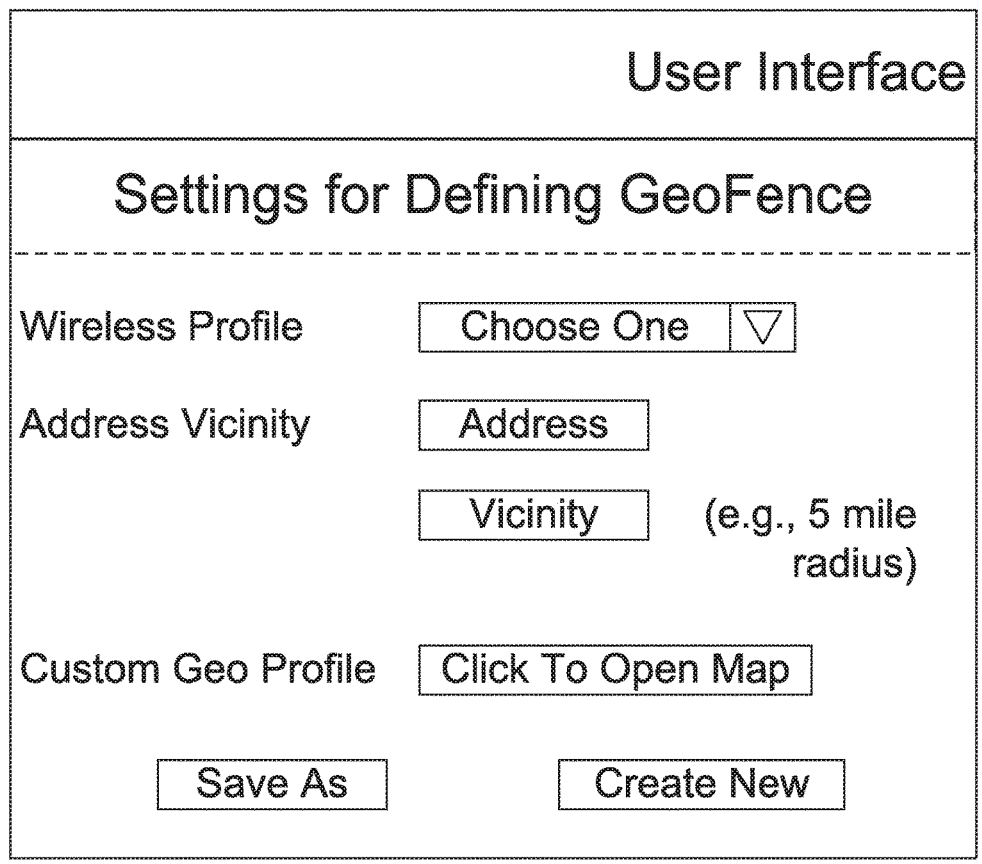

FIG. 3A illustrates an example of a user interface that allows the user to define various geofence parameters. Here, in some cases, the user may utilize more than one parameter for defining a single geofence and save the definition as a particular geofence in association with the user's profile. In some instances, the user may apply these parameters dynamically when a geofence needs to be established. In the example shown in FIG. 3A, the user defined a specific wireless network profile (or an IP address associated with a wireless profile) as the sole parameter for creating a first geofence (geofence setting 1). In this example, when the user selects "choose a wireless profile," the system may automatically retrieve a list of available wireless profiles, or allow the user to define a particular wireless profile. In examples, once the "geofence setting 1" is established, the defined geofence may be instantly applied or may be added to the user's geofence profile (maintained, for example, by the geofence server 114) for later use by the user in conjunction with a particular geofence application.

The user interfaces, the geofence services, etc. illustrated here and through the rest of this application may be offered as part of a mobile application (an "app") offered through the user's mobile device. These interfaces may also be offered in the form of regular web pages that the user may access from the user's mobile device or any other computing device. Here, the user may access his geofence profile by means of a login account that can be accessed over any web operated computing device where the user can make the required changes or definitions within her geofence profile.

FIG. 3B illustrates a user interface allowing the user to apply geofence settings from the user's geofence profile to various "geofence applications." Examples of such geofence applications are explained in further detail below. The user is provided a list of various geofence applications allowing the user to pick one or more applications to be enabled. In addition to enabling a particular geofence application, the user also has the option of specifying a particular geofence setting to be applied to each of the enabled applications. For example, the user may enable an auto-profile option. Here, in examples, the user may not need to specify a geofence setting because the geofence service would automatically identify geofences. In the example shown in FIG. 3B, the user has also enabled the "vibrate-settings" geofence application. Here, the user would also have the option of picking one of a list of previously defined geofences to assign to this particular application. Other examples of geofence applications shown in FIG. 3B are: garage opener application; home temperature-setting application; phone 3G enable/disable application; etc.

Figure 4A:
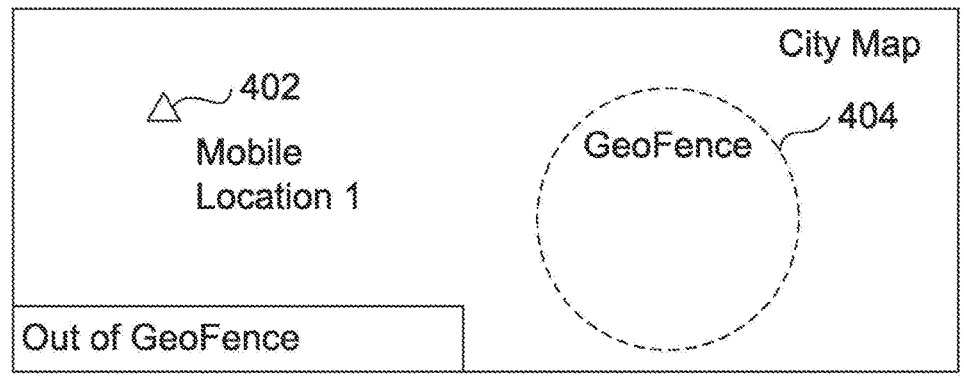
FIGS. 4A-4C describe the operation of the geofence service.
Figure 4B:
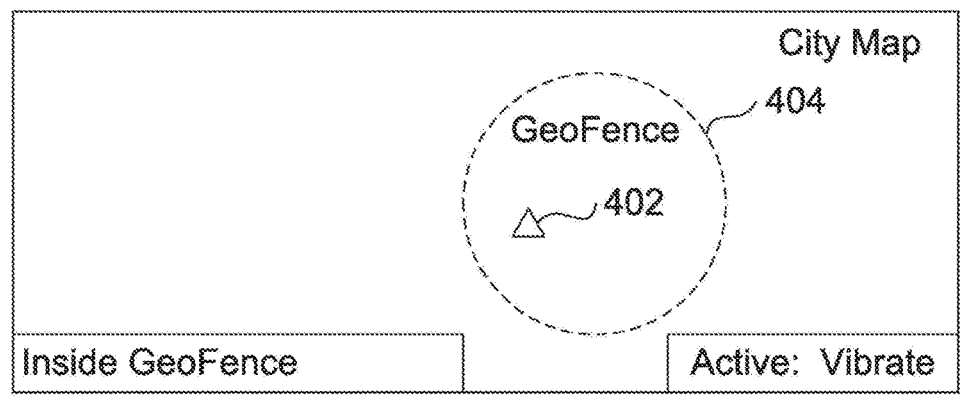
Figure 4C:
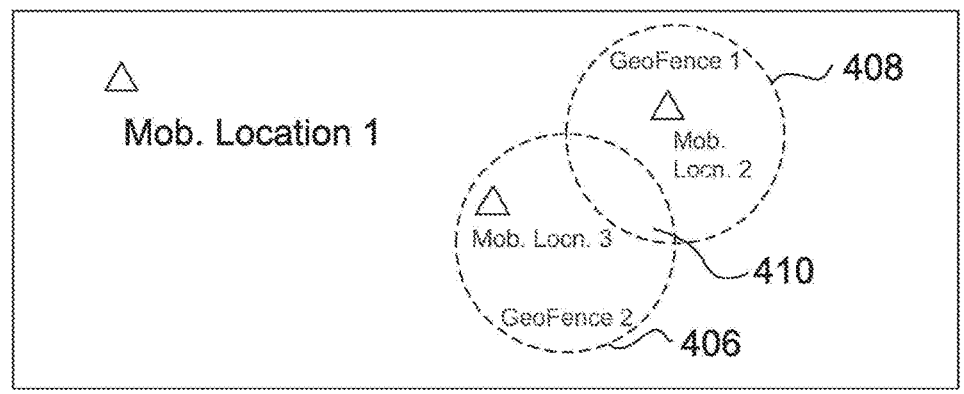

FIGS. 4A-4C are used to describe an example of how the geofence service operates. Here, the user's current location is indicated by the triangle 402. In this example, the geofence service operates on the basis of geofence 404. For operation, the geofence service may, for example, install an application that runs in the foreground of the user's mobile device to track the user's mobile location relative to selected geofences and control activation of geofence applications based on the user's location relative to the selected geofences. In the examples of FIGS. 4A and 4B, when the geofence service determines that the user is outside of geofence 404, it does not enable a particular geofence application (that may have been previously specified for geofence 404). When the user enters the geofence area 404, the geofence service activates one or more particular geofence applications (e.g., phone-ringer application, temperature control application, etc.) that were previously assigned to the particular geofence.

In some examples, several geofence applications may be simultaneously enabled, as shown in FIG. 4C. In this example, two geofences are defined: geofence 408 and geofence 410. The two geofences have an overlap defined by region 410. In this example, geofence 408 is associated with a phone-ringer application. Geofence 408 is associated with a garage opener application. Accordingly, the overlap region 410 is associated with both the phone-ringer and garage opener applications. Here, if the user is located at mobile location 1, the geofence service does not enable either of the two applications. If the user is located at geofence overlap 410, both applications are enabled. If the user is located at a location of geofence 408 that is not covered by the overlap region 410, only the phone-ringer application is turned on. If the user is located at a location of geofence 406 not covered by overlap region 410, only the garage opener application is enabled.

Phone-Ringer and Smart-Phone Power-Control Geofence Applications

This paragraph provides a more detailed description of the phone-ringer geofence application. When this application is enabled for a given geofence, the geofence service enables vibrate (and deactivates ringing or changes the volume setting as defined by the user) when a user enters a particular geofence. In an illustrative example, the user has the phone normally enabled at full volume when he is at home and when he is in his car. However, when he reaches work, workplace restrictions may require the user to have his mobile phone in vibrate. The user may forget to switch to vibrate option every time he enters work and may forget to switch back to ring when he leaves work. To avoid this inconvenience, the user may enable the geofence vibrate application where he may have set his geofence by either defining a wireless profile his phone connects to automatically when he enters work, or by defining a 1 mile radius around work as the geofence, etc. Accordingly, when the user enters the work based geofence, the geofence service triggers the user's mobile-device to automatically switch to the defined vibrate setting. When the user leaves the geofence location, the geofence service may cause the mobile device to automatically revert to the ring option.

The above example was specific to controlling the phone's "ringer." In examples, smart-phone controls (e.g., wireless radios, Bluetooth radios, etc.) may also be enabled or disabled using geofence services. Examples of such controls or functionalities may include: 3G (or 4G or the equivalents) setting, data or voice roaming settings, Wi-Fi setting, cellular data setting, tethering setting, phone auto-lock, Bluetooth setting, etc. Using an appropriate combination of geofences and geofence applications that enable or disable such features the user could potentially ensure that the battery charge cycle of the phone is enhanced or extended by selectively (and automatically) enabling and disabling the power sensitive settings of the mobile device.

Other Examples of Geofence Applications

In embodiments, in addition to, or in lieu of controlling features within the user's mobile device, the user may also utilize the geofence service to control external applications. Some such examples are discussed herein with respect to FIGS. 5A-5C. While these illustrations use specific examples such as garage opening applications, temperature setting applications, power control applications, etc., these geofence services can be extended to any other application that benefits from remote and automatic controlling based on the user's present geographic location (as determined by the location of the user's mobile device).

Garage Opener Geofence Application

FIG. 5A shows an example where the geofence service is utilized for a remote garage-opener geofence application. Here, a garage door (or mechanism controlling the garage door) is pre-fitted with a communication device that allows the garage door to receive remote instructions through radio messaging. For example, the garage opener may be fitted with an RFID device or a wireless radio device that receives a signal over the network. In some examples, the wireless device could just be connected to a home network of the user's home, allowing it to receive instructions through the home network. For example, the user's mobile device would send an instruction to the home network, allowing the home network to select and send a corresponding instruction to the wireless device attached to the garage opener. In some examples, the garage openers are already fitted with wireless receivers (e.g., from the wireless remote controls). Here, the home network would simply cause the wireless sensor to be activated appropriately.

Such remote connection capabilities, enabling remote operation of garage openers, indoor climate controllers, wireless indoor appliance controllers, etc. through, for example, a home network or through an internet connection, are already in use in current technologies. The geofencing services may simply be built on top of such existing remote communication capabilities to be able to control such devices. For example, the user may utilize X10 interfaces to electric appliance modules to enable control of the electric appliances over a network by means of X10 signals. In another example, a user may utilize LnCP protocols (developed by LG Homenet), which allows Internet-aware appliances to use existing electrical wires to talk to one another or be controlled using signals sent by a mobile device.

As shown in FIG. 5A, a user interface allows a user to control geofence settings for a garage opener application. Here, the user can create a profile that allows the garage door to be automatically opened when a user enters a given geofence. Accordingly, when a user enters a geofence (defined, for example, by a radius about the user's home address), the geofence service detects the entry and transmits a message, for example, to the home network or an internet service that controls the wireless device attached to the garage opener application. The garage door then automatically opens up in advance (e.g., when the user is 0.2 miles away from home), allowing the user to simply drive straight into his garage. in some examples, as illustrated in FIG. 5A, the user may even build in a delay to the garage-opening action after the user enters the geofence.

Temperature Setting Geofence Application

FIG. 5B illustrates a user interface for a remote temperature control using the geofence service. In some cases, the user may wish to control the temperature within a room or a house or an office based on the user's current geographic position. For example, the user may wish to turn on the AC or start decreasing the temperature setting of the room or office when the user is only 10 miles away from reaching the room or office. In conventional systems, the user would simply use a time-based approach to control settings. That is, the temperature is set to 82 F at 6 PM, and 76 F at 7 PM, with the assumption that the user arrives home at 7 PM. But this conventional system results in power wastage when the user decides to stop for dinner before arriving home at 9 PM (causing the home to be unnecessarily cooled to 76 F for the two hours the user is not even at home). This disadvantage is cured by the geofence application. In one example, the temperature is set to 76 F only when the geofence application detects that the user is within a 2-mile radius of the house. In this example, the user would have previously established a 2-mile geofence around his house, and paired the geofence with the temperature-setting geofence application to coordinate such automatic location-based control.

In some instances, the user may want to stagger the change in temperature settings to be energy efficient. For example, on a hot day, the user may want to decrease the temperature control from an original value of 90 F to 86 F when the user is 10 miles away, to 84 F when the user is 5 miles away and to 76 F when the user is a mile away. This way, if the user decides to stop for dinner 5 miles away from home, the temperature does not switch to a lower value until the user actually enters the 5-mile radius. Also, gradually decreasing (or decreasing in a staggered fashion) decreasing the temperature based on different proximities of the user allows energy efficient decrease of temperature (instead of suddenly dropping the temperature from 90 F to 76 F when the user enters a 2-mile radius of the house). For such a staggered temperature control example, the user may define multiple geofences (one for 10 miles, one for 5 miles, one for 2 miles, etc. around the house address) and apply all the geofences simultaneously (with each geofence setting applied for a different temperature value) for the staggering to work. In other examples, the user may define all the stagger values within one geofence using suitable user interfaces offered by the geofencing application. One example of such a user interface is shown in FIG. 5B to allow the user to create such settings. Accordingly, in an illustrative example, when the user leaves his home and is more than 2 miles away from the house, the temperature setting is allowed to increase as high as 90 F to save energy associated with cooling the house. Later, when the user is on his way back home, the geofence service automatically detects the user's presence within one or more geofences to selectively control the temperature, ensuring that the user returns home to an optimal temperature setting.

Geofence-Based Appliance Control

FIG. 5C is example of a geofence application, where geofences are used for controlling electrical or electronic appliances in a house or other such location. Using suitable user interfaces (an example is shown in FIG. 5C), the user may perform a variety of operations to efficiently control and manage appliances in his home. Some examples where the geofence services may be applied are listed below:

(1) When a user leaves his house, he may forget to turn off unessential appliances such as lights and fans and so want such appliances automatically switched off when he leaves a geofence he defined around his house. On the other hand, the user may want these turned on when he comes back home.

(2) The user may want the user's lawn to be watered (i.e., the water sprinklers to be activated) only after the user leaves his home in the mornings or after he is located a certain distance away from his home (or a certain duration after he leaves a geofence associated with his home).

(3) The user may wish to automatically engage a home alarm when the user leaves his house (or after a certain duration of time after the user leaves the geofence associated with his house) and automatically disengage the alarm after the user enters the geofence (or after a certain duration of time after the user enters the geofence).

(4) The user may wish to start his dishwasher or washer or dryer after he leaves the house (or after leaving the house's geofence) so that the noise does not bother him.

(5) The user may wish to automatically control the temperature setting of the water heater in house based on the user's current geographic location in order to conserve resources.

(6) The user may want to automatically control a music player or other entertainment device setting to ensure that the entertainment device, for example, plays a soothing music after the user's arrival within a geofence (i.e., just before the user enters the house).

To accomplish these illustrative examples, a user may draw one or more geofences and use corresponding geofence application interfaces to accomplish such automatic control of remote devices or appliances. The example in FIG. 5C would allow the user to set preferences for some such appliances. In these examples, the geofence service monitors the user's position, and then transmits a signal to the home network or other wireless capability associated with the electrical appliance to switch on or off or otherwise control the appliance based on the user's current geographic position.

Figure 6:
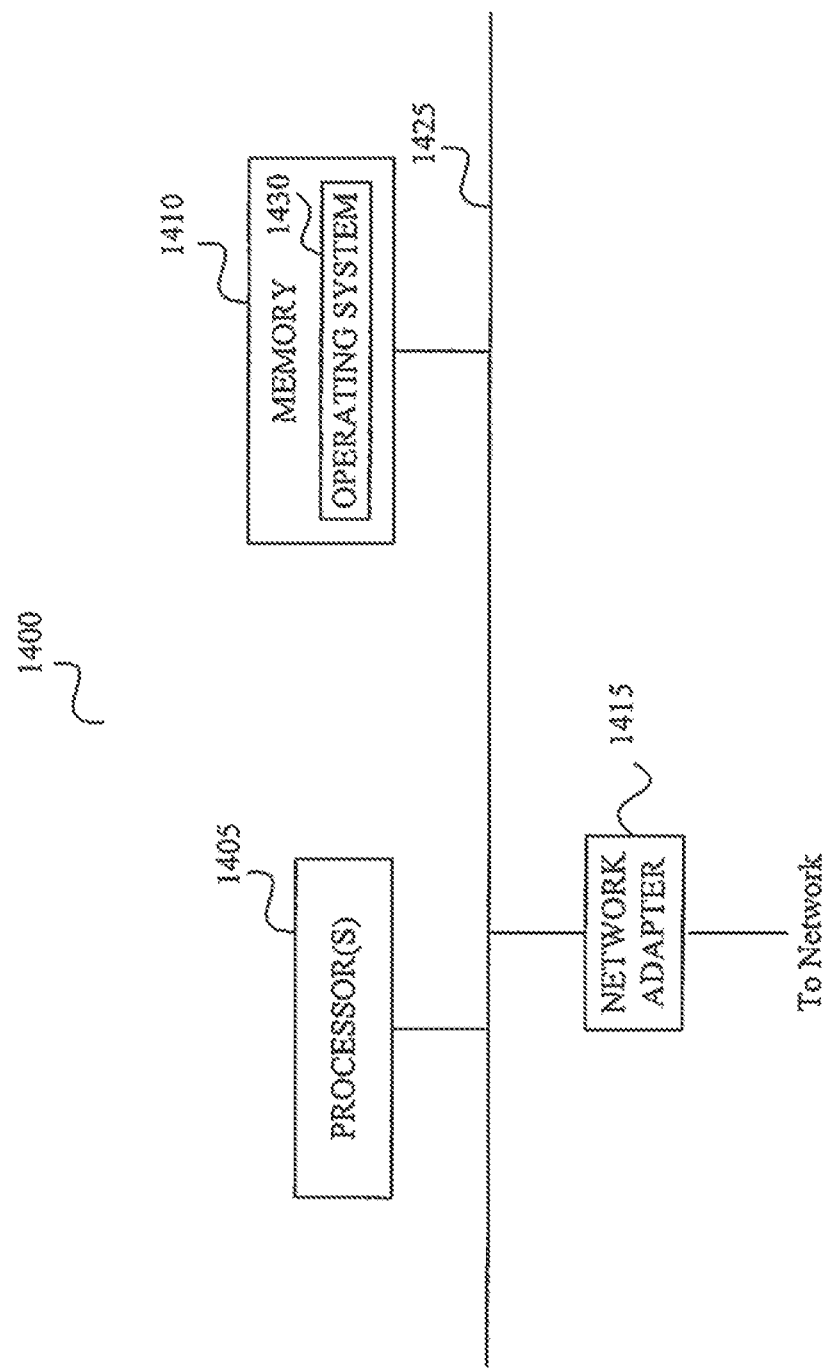
FIG. 6 is a high-level block diagram showing an example of the architecture for a computer system that can be used to practice this invention.

FIG. 6 is a high-level block diagram showing an example of the architecture for a computer system 1400 that can be utilized to implement a geofence server, a web server, a computing device, etc., for performing the various operations discussed in this application. In FIG. 6, the computer system 1400 includes one or more processors 1405 and memory 1410 connected via an interconnect 1425. The interconnect 1425 is an abstraction that represents any one or more separate physical buses, point to point connections, or both connected by appropriate bridges, adapters, or controllers. The interconnect 1425, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire".

The processor(s) 1405 may include central processing units (CPUs) to control the overall operation of, for example, the host computer. In certain embodiments, the processor(s) 1405 accomplish this by executing software or firmware stored in memory 1410. The processor(s) 1405 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 1410 is or includes the main memory of the computer system. The memory 1410 represents any form of random access memory (RAM), read-only memory (ROM), flash memory (as discussed above), or the like, or a combination of such devices. In use, the memory 1410 may contain, among other things, a set of machine instructions which, when executed by processor 1405, causes the processor 1405 to perform operations to implement embodiments of the present invention.

Also connected to the processor(s) 405 through the interconnect 1425 is a network adapter 1415. The network adapter 1415 provides the computer system 1400 with the ability to communicate with remote devices, such as the storage clients, and/or other storage servers, and may be, for example, an Ethernet adapter or Fiber Channel adapter.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

We claim:

1. A method, comprising
receiving, in association with a temperature control device located at a given base location, the temperature control device having a temperature setting that is variably set to different values based on corresponding distances of a user from the base location, an indication of a user moving from a first geofence to a second geofence of a plurality of geofences, each geofence associated with identifying the user at a location outside of the base location and situated with respect to the base location; wherein each of the plurality of geofences has an associated and distinct temperature value or temperature range value, the temperature value or the temperature range value corresponding to a temperature setting in the temperature control device, and wherein geographic location identifying capabilities in the user's device provides information related to the user's current geographic location, the current geographic location used at least in part to determine the user's moving from the first geofence to the second geofence;

upon receiving the indication of the user moving from the first geofence to the second geofence, determining that the user is moving in a direction closer to the base location based on the direction of movement and relative distance of the user from the base location; further determining a first temperature value or first temperature range value associated with the second geofence; and in response to the determination, causing the temperature setting in the temperature control device at the base location to be adjusted from its current temperature value to substantially the first temperature value or within the first temperature range value, the first temperature value or first temperature range value closer in value to an optimally desired temperature setting value of the temperature control device.

2. The method of claim 1, wherein the second geofence is embedded within the first geofence.

3. The method of claim 1, wherein at least two of the plurality of geofences have at least a partial overlap.

4. The method of claim 1, wherein a given geofence corresponds to a given geographic region based on one or more of:
- a zip or postal identification information associated with the given geographic region;
- a boundary established in a map identifying the given geographic region; or
- a substantially radial perimeter defining the given geographic location with respect to a particular geographic location.

5. The method of claim 1, wherein the temperature control device is a temperature thermostat located at a particular geographic location associated with the user, further wherein the user's mobile computing device is remote to the particular geographic location, and wherein the temperature setup control action controls the temperature setting of the temperature thermostat based at least in part on the user's presence in a given geofence of the plurality of geofences.

6. A method, comprising:
- determining, using a first user location of a user based on the geo-location of the user's mobile device, that the user is at a first distance away from a base location, the base location having a thermostat control with a temperature setting that is variably set to different values based on corresponding distances of the user away from the base location;
- determining, based on a movement of the user from the first user location to a second user location outside of the base location, a second distance of the user away from the base location;
- based on the second distance being shorter than the first distance, causing the temperature setting of the thermostat control to be moved from a first value to a second value that is closer in value to an optimally desired temperature setting than the first value; and
- causing the temperature setting of the thermostat control to be set at various discrete values that are progressively closer in value to the optimally desired temperature setting than the second value based on the user moving to different locations after the second user location and in a direction toward the base location, the user's movement toward the base location sensed based on the geo-location of the user's mobile device.

* * * * *